United States Patent [19]

Kretschmer, Jr. et al.

[11] Patent Number: 4,626,854

[45] Date of Patent: Dec. 2, 1986

[54] METHOD AND APPARATUS FOR GENERATING A MODIFIED $P_1$ CODE

[75] Inventors: Frank F. Kretschmer, Jr., Laurel; Bernard L. Lewis, Fort Washington, both of Md.

[73] Assignee: The United States of America as represented by the Secretary of the Navy, Washington, D.C.

[21] Appl. No.: 532,114

[22] Filed: Sep. 14, 1983

[51] Int. Cl.[4] .............................................. G01S 13/28
[52] U.S. Cl. .................................................. 342/196
[58] Field of Search ........... 343/17.2 PC, 5 DP, 5 FT

[56] References Cited

U.S. PATENT DOCUMENTS

| | | | |
|---|---|---|---|
| 4,237,461 | 11/1980 | Cantrell et al. | 343/5 FT |
| 4,373,190 | 2/1983 | Lewis et al. | 343/17.2 PC X |
| 4,379,295 | 4/1983 | Lewis et al. | |

OTHER PUBLICATIONS

NRL Report 8540 entitled "Polyphase Pulse Compression Waveforms", by F. F. Kretschmer, Jr. and B. L. Lewis, dtd Jan. 5, 1982.

Primary Examiner—Thomas H. Tarcza
Assistant Examiner—Mark Hellner
Attorney, Agent, or Firm—Sol Sheinbein; Charles E. Krueger

[57] ABSTRACT

A digital pulse expander-compressor for use in pulse compression radars and having the advantage of pre-compression bandwidth tolerance. The pulse expander-compressor employs a discrete Fourier transform circuit and multi-stage delay line feeding inputs x(n) to the discrete Fourier transform circuit to generate outputs in accordance with the formula $$F_k = \Sigma x(n) \exp[-j2\pi nk/N]$$

where n is the sequence number of the clock pulse; N is an even integer corresponding to the number of delay stages plus one and k is the number of the output subpulse from the transform circuit. An arrangement of delay stages differentially delays the output subpulses from the discrete Fourier transform circuit, and a coherent summer adds the real and imaginary parts of the signals from the delay lines. The delay stages delay the subpulse $F_k$ by nN clock pulse intervals where n and k are interrelated by the formulae $k = N/2 - n$ for $n = 0, 1, \ldots$, and $N/2$ and $k = (3N/2) - n$ for $n = N/2 + 1, N/2 + 2, \ldots, N - 1$. The pulse expander-compressor generates a modified, $N^2$ element P1 polyphase code that is tolerant to receiver bandwidth limitations.

9 Claims, 5 Drawing Figures

METHOD AND APPARATUS FOR GENERATING A MODIFIED P₁ CODE

BACKGROUND OF THE INVENTION

This invention relates generally to polyphase code systems and more particularly to digital systems for coding and decoding sequences of polyphase encoded systems.

In a conventional radar, the transmitted waveform is a train of pulses as shown in FIG. 1a of the accompanying drawing. The mean power is determined by the peak power and the duty ratio, that is to say the ratio of the width of the pulses to the overall repetition period T.T. is fixed by the maximum unambiguous range, and the $\tau$ by the resolution required. Thus, to improve the detectability of the radar only the peak power can be increased and this is limited by the components used. There is therefore a confict of interest if both improved detectability and resolution are required.

It is now recognized that the resolution is not governed by the pulse length but by the overall transmitted bandwidth. Thus, by modulating the carrier within the transmitted pulse length the bandwidth is increased and the resolution improved with no reduction in mean transmitted power.

One known form of modulation to effect pulse compression is phase modulation in which, within the width of the transmitted pulse, the phase is changed at specified intervals or subpulses. While these phase changes can follow a random sequence, by using certain well-defined sequences known as "Frank Codes" it is possible to reduce the level of the sidelobes after processing of the received pulse. An example of a known method to transmit and detect Frank-coded radar pulses is described in U.S. Pat. No. 4,237,461.

In FIG. 1(b) of the drawings, there is shown the pattern of phase changes within a pulse 11 subdivided into four phase groups of subpulses 11 a–d, each phase group having four subpulses $\tau$ seconds long, so forming a Frank code with a pulse compression ratio of $(4)^2 = 16$. The subpulses are at a constant carrier frequency and related to a CW reference signal by a phase angle of (n)(90°), where $0 \leq n \leq 3$. The phase, in radians encoded on each of the subpulses 11a–d of the pulse 11 may be determined from the matrix of Table 1, as read from left to right progressing from the top to the bottom row.

TABLE 1

| 0 | 0 | 0 | 0 |
|---|---|---|---|
| 0 | $\pi/2$ | $\pi$ | $3\pi/2$ |
| 0 | $\pi$ | 0 | $\pi$ |
| 0 | $3\pi/2$ | $\pi$ | $\pi/2$ |

A clockwise phase rotation (phase delay) has arbitrarily been assigned a negative value while a counterclockwise rotation (phase advance) is designed a positive value. A phase advance of X radians is equivalent to a phase delay of $2\pi-X$ radians. This phase in complex numbers is shown in Table 2.

TABLE 2

| 1 | 1 | 1 | 1 |
|---|---|---|---|
| 1 | j | −1 | j |
| 1 | −1 | 1 | −1 |
| 1 | −j | −1 | +j |

The phases encoded on the four subpulses of the first phase group 11a are indicated in the top row of the matrix of Table 1 or Table 2; the phases encoded on the four subpulses of the second phase group 11b are indicated in the second row of the matrix; the phases for the four subpulses of the third phase group 11c in the third row: and the phases for the four subpulses of the fourth phase group 11d in the fourth row. Examining the phases encoded on the the four subpulses of each phase group 11a–d, it will be seen that the phase increases linearly from subpulse to subpulse at a rate of 0 radians per subpulse in the first phase group 11a; at a rate of $\pi/2$ radians per subpulse in the second phase group 11b; at a rate of $\pi$ radians per subpulse in the third phase group 11c; and at a rate of $3\pi/2$ (or $-\pi/2$) radians per subpulse in the fourth phase group 11d. Examining the slope of the phase increase of each phase group, it will be seen that the slope increase linearly from phase group to phase group at a rate of $\pi/2$ radians per phase group. Since frequency is the rate of change of phase, linearly increasing phase is a constant frequency. Thus, each phase group 11a–d represents a different frequency measured with respect to the carrier frequency, viz. 0, $(\pi/2)/\tau$, $\pi/\tau$, and $(3\pi/2)/\tau$ (or $-(\pi/2)/\tau$) respectively for each of the phase groups in order. Since the frequency (slope of phase) also changes linearly by $(\pi/2)/\tau$ from phase group to phase group, the Frank code is seen to be a step-wise approximation to a swept frequency.

The auto-correlation function of pulse 11 as might be obtained in the matched filter of a pulse-compression radar receiver is shown in FIG. 1c. This graph shows the level of correlation of a pulse as in FIG. 1b with a similar pulse when plotted against the relative time of the pulses being completed. It will be seen that except at coincidence in time, the correlation function takes on values between 0 and 1 and that when the two signals are coincident the correlation function has a value of 16. This means that though the transmitted pulse has an overall duration of $16\tau$, the resolution of the radar is $1\tau$ and there is a ratio of 16 to 1 between the level of the sidelobes and the correlation peak.

One problem with the Frank Code has been an increase in the sidelobe level of the autocorrelation function due to the bandwidth limitations in radar receivers. This bandwidth limitation causes maximum attenuation in those phase groups with large shifts between adjacent subpulses. Note that for the 16 element Frank code the large shifts between adjacent subpulses occurs in the third phase group 11c. It has been determined that the increase in sidelobe level is a maximum when attenuation is a maximum near the center of the phase coded pulse and a minimum when maximum attenuation takes place near the ends of the pulse. Thus the Frank Code experiences a significant sidelobe level increase because the third phase group 11c ($0\pi0\pi$) is near the center of the pulse.

This inverse weighting disadvantageously suppresses the peak response of the radar receiver. It also reduces the ratio between the correlation peak of the autocorrelation function and the level of the sidelobes. This reduction is undesirable because it increases the possibility that weak target echos will be hidden by the sidelobes from an adjacent stronger target echo.

In order to lower the sidelobe level of the autocorrelation function various codes have been developed with the phase changes ordered so the maximum phase shifts occur near the ends of the pulse. In particular in U.S. Patent Application No. 65,456, filed 8-10-79, now abandoned by F. Kretschmer discloses an apparatus including an N point FFT with N being an even integer and fixed phase shifters interconnected to generate a P1 coded pulse. The P1 coded pulse generated exhibits the desired low sidelobe level. However, the fixed phase shifters interconnected with the N point FFT is a relatively complicated and expensive structure.

OBJECTS OF THE INVENTION

Accordingly, it is an object of the invention to generate a $N^2$ element phase code where N is an even integer having lower auto-correlation sidelobe levels than the Frank Code when processed by a system with a band-limited receiver.

It is a further object to simplify the circuitry required to generate the above described $N^2$ element phase code.

SUMMARY OF THE INVENTION

The above and other objects are achieved in the present invention which is a pulse expander-compressor (PEC) for generating a modified P1 code with precompression bandwidth tolerance. The PEC includes an FFT circuit for generating the N phase groups of an $N^2$ element Frank Code, where N is an even integer. The invention also includes a circuit for rearranging the phase groups of the Frank Code into a modified P1 code having those phase groups with the largest phase shifts between subpulses positioned near the ends of the phase code.

In one embodiment the outputs, $F_N$, of an N point FFT are interconnected with a delay-summation circuit. The output signals from $F_N$ corresponds to the phase changes of the $N^{th}$ phase group of an $N^2$ element Frank Code. The various FFT outputs are differentially delayed so that those phase groups with large phase shifts between subpulses are positioned near the end of the code.

DESCRIPTION OF THE PREFERRED EMBODIMENT

Figure 2:
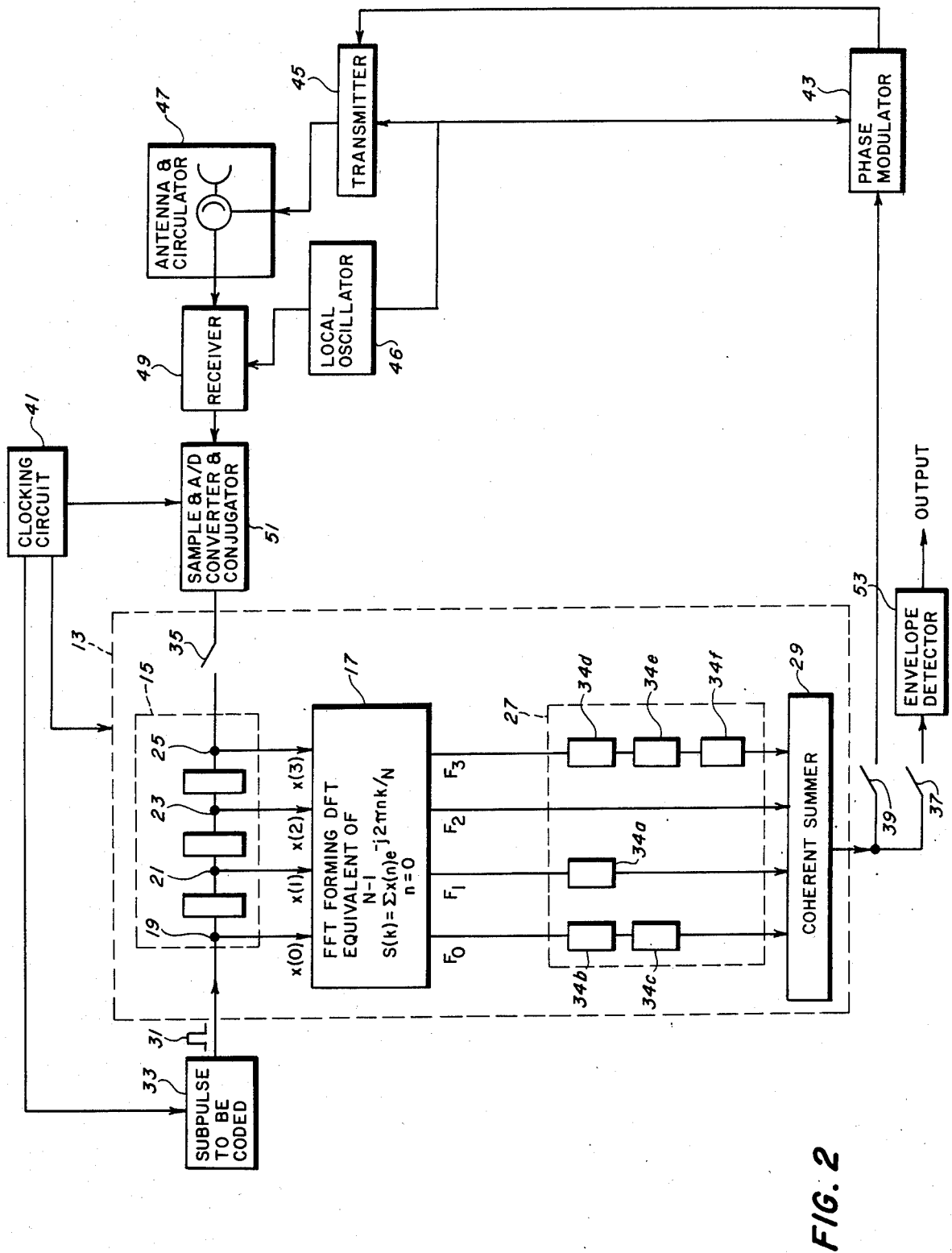
FIG. 2 is a block diagram of an embodiment of the pulse expander-compression radar.

An embodiment of the digital pulse expander-compressor 13 which exhibits the advantage of precompression bandwidth tolerance is shown in FIG. 2 enclosed in the dashed lines.

The pulse expander-compressor 13 includes transform means for successively generating N (where N is an even integer) replicas x(n) of an applied subpulse of duration $\tau$, where n=0, 1,2, ..., N−1, in a time which is N times the duration, $\tau$, of the subpulse, and for weighting the replicas x(n) to provide N weighted subpulses $F_k$ where k=0,1,2, ... N−1, at respective output terminals of the transform means whenever one of the N replicas is generated. The weighted subpulse $F_k$ is related to the unweighted subpulses x(n) in accordance with the formula $$F_k = \sum_{n=0}^{N-1} X(n)\exp[-j2\pi nk/N].$$

While the transform means may take a variety of forms conveniently it may take the form illustrated in FIG. 2 of a delay means 15, and a conventional fast Fourier transform circuit 17 which is connected to the delay means 15.

Delay means 15 has N distributed output terminals 19, 21, 23, and 25 (including the input terminal) for producing a uniform delay the length of the applied subpulse between adjacent ones of successive output terminals. (N=4 in the illustrated embodiment but it is to be understood that N may be any even integer). Delay means 15 may comprise, for example, a delay line having a plurality of equal delay stages with output terminals at its input and after every stage.

The fast Fourier transform circuit 17 is coupled to the N distributed output terminals 19, 21, 23 and 25 of the delay means 15 for forming discrete Fourier transform signals $F_k$ equivalent to formula (1).

Also included in the pulse expander-compressor 13 is delay-summation means for selectively delaying each of the weighted subpulses $F_k$ corresponding to any replica of the applied subpulse, and for separately summing the real and imaginary parts of the delayed subpulses 27 and 29. The delay-summation means 27 delays each of the weighted subpulses $F_K$ as follows: The weighted subpulse $F_k$ is delayed by a time which is n·N times as long as the applied subpulse where k=N/2−n, for n=0,1, ..., N/2 and $$k = \frac{3N}{2} - n, \text{ for}$$

$$n = \left(\frac{N}{2} + 1\right), \left(\frac{N}{2} + 2\right), \ldots, (N-1).$$

While the delay-summation means 27 may take a variety of forms, conveniently it may take the form illustrated in FIG. 2 of a plurality of delay means 34a-34f, and a coherent summer 29 which is connected to the plurality of delay means.

Each of the delay means 34a-34f produces a delay between its input and its output which is N times the length of the applied subpulse. Each of the delay circuits 34a-34f may comprise, for example, an N stage shift register wherein each stage produces a delay equal to the length of the applied subpulse. As illustrated, such delay means are serially connected between the coherent summer 29. The output $F_k$ is serially connected with n delay circuits where k and n are interrelated by the following formulae:

k=N/2−n for n=0,1 ..., N/2 and k=3N/2−n for n=(N/2+1), (N/2+2), ..., N−1

FIG. 2 illustrates the digital pulse expander-compressor as it might be used as part of a pulse compression radar. In operation, a pulse generator 33 generates the initial applied subpulse 31 of length $\tau$. Switches 35 and 37 are opened while switch 39 closed. The subpulse 31 is clocked into the delay means 15 which provides three equal intervals of delay, each equal to τ. Outputs are taken from the input terminal 19 of the first delay stage, the output terminal 21 of the first delay stage the output terminal 23 of the second delay stage, and the output terminal 25 of the third delay stage, viz., x(0), x(1), x(2), x(3), respectively. Time zero (0) corresponds to the interval of the first clock pulse when the subpulse 31 to be coded is clocked out of the pulse generator 33 and applied to the input terminal 19 of the first delay stage; time (1) corresponds to the interval of the second clock pulse which permits the subpulse 31 at the input terminal 19 of the first delay stage to pass through the first delay stage and to be replicated at its output terminal 21; and so on. The clocking circuit is shown in simplified form in block 41. The clock pulse intervals are of length τ. The delay means 15 essentially provides for time expansion of the subpulse 31. It provides four input signals to the fast Fourier transform circuit 17, viz. 1000,0100,0010, and 0001 in a time 4τ which is four times as long as that of the applied subpulse 31. (The presence of a subpulse replica is denoted by a 1, the absence of a subpulse replica by a 0). A tabulation of the (x) outputs is provided in Table 3.

TABLE 3

|  | x(0) | x(1) | x(2) | x(3) |
|---|---|---|---|---|
| 1st clock pulse: | 1 | 0 | 0 | 0 |
| 2nd clock pulse: | 0 | 1 | 0 | 0 |
| 3rd clock pulse: | 0 | 0 | 1 | 0 |
| 4th clock pulse: | 0 | 0 | 0 | 1 |
| 5th etc. clock pulse: | 0 | 0 | 0 | 0 |

A tabulation of the corresponding (F) outputs from the fast Fourier circuit 17 which forms discrete Fourier transform signals $F_k$ equivalent to formula (1) is provided in Table 4.

TABLE 4

|  | $F_0$ | $F_1$ | $F_2$ | $F_3$ |
|---|---|---|---|---|
| 1st clock pulse: | 1 | 1 | 1 | 1 |
| 2nd clock pulse: | 1 | −j | −1 | +j |
| 3rd clock pulse: | 1 | −1 | 1 | −1 |
| 4th clock pulse | 1 | +j | −1 | −j |

The outputs from $F_2$ the fast Fourier transform circuit 17, are individually fed to the plurality 27 of delay means, each of which supplies a delay equal to four clock pulse intervals. Thus, $F_1$ has a delay of 4τ, $F_o$ a delay of 8τ, $F_3$ has a delay of 12τ, and $F_2$ has no delay. For the first four clock pulses, the only inputs to the coherent summmer 29 are the series of complex subpulses on the $F_2$ line; for the next four clock pulses, the series of complex subpulses on the $F_1$ line; and for the next four, the series of complex subpulses on the $F_o$ line and for the last four, the series of complex subpulses on the $F_3$ line. Note that the complex subpulses on the $F_k$ line correspond to the phase changes of the (k+1) th phase group of the Frank Code set forth in Table 2. The summer 29 separately adds the real parts and the imaginary parts of the subpulses so that a single subpulse with a real and an imaginary part is formed for each clock pulse interval. These subpulses are fed to the phase modulator 43 where they modulate the phase of the carrier pulse of the transmitter 45. The sequence of subpulses fed to the phase modulator 43 is

| (1) | (−1) | (1) | (−1) |
|---|---|---|---|
| (1) | (−j) | (−1) | (+j) |
| (1) | (1) | (1) | (1) |
| (1) | (+j) | (−1) | (−j) |

Figure 1A:
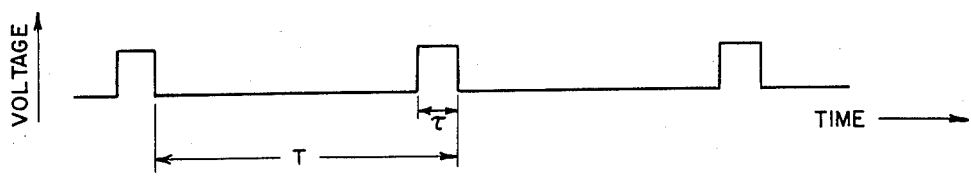
FIGS. 1a-1c depict the pattern of phase changes within a transmitted pulse and the auto-correlation function of the pulse.
Figure 1B:
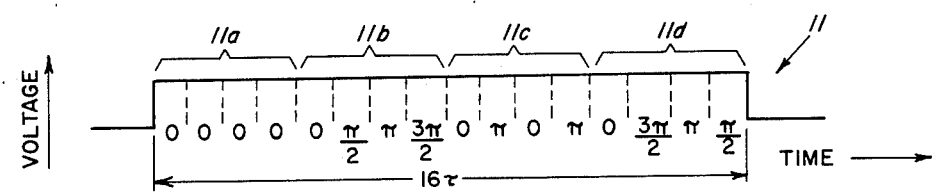
Figure 1C:
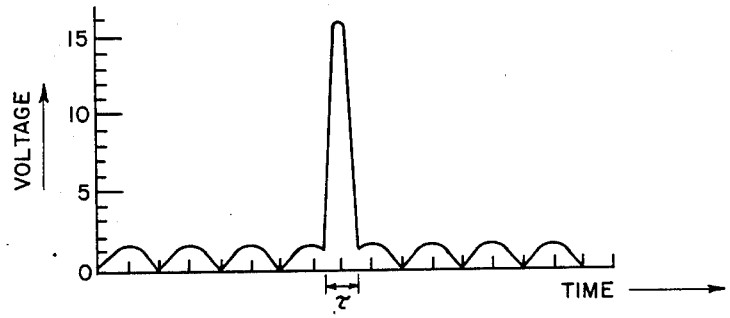
Figure 3:
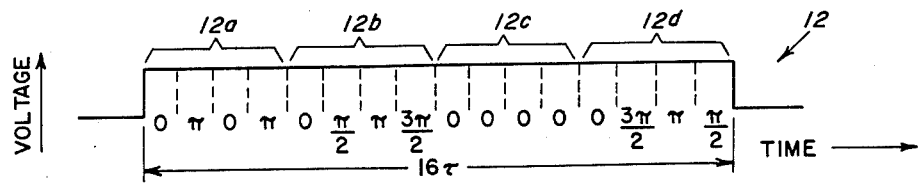
FIG. 3 depicts the pattern of phase changes within a pulse transmitted by the radar of FIG. 2.

Note that the output pulse from the phase modulator 43 extends over 16 clock pulse intervals. The pattern of phase changes within the modulated carrier pulse 12 is shown in FIG. 3. The phase-modulated carrier pulse is propagated into space by the antenna 47 and if it strikes a target, an echo signal is returned. If the receive mode, switches 35 and 37 are closed while switch 39 is opened. The echo signal is processed through the receiver 49 and sent through the sampler-and A/D coverter circuit 51 which converts the phase-modulated carrier pulse into a sequence of complex subpulses again. These subpulses are fed back through the delay means 15 but the delays are now in time-inverted order, that is, x(3) now has no delay, x(2) is delayed one clock pulse interval, x(1) two clock pulse intervals and x(0) three clock pulse intervals. The time-inverted delayed subpulses are again fed through the fast Fourier transform circuit 17 to the plurality 27 of delay means which is arranged to provide the delays for the weighted subpulses $F_o$, $F_1$, $F_2$, and $F_3$ as before. Thus, no delay is inserted in $F_2$, 4τ of delay in $F_1$, 8τ delay in $F_o$, and 12τ in $F_3$. The output of the plurality 27 of delay means is fed through the coherent summer 29 and the envelope detector 53 to provide a cross-correlated facsimile of the original applied subpulse 31, in the manner of a matched filter. The output of the coherent summer 29 (the auto-correlation function) has a peak amplitude in the twelfth clock pulse interval, which can be seen in the output of the envelope detector 53.

Referring now to FIG. 3, which shows the pattern of subpulses within the modulated carrier 12, it is seen that the end subsequence 12a is the third phase group 11c of the Frank Code set forth in Table 1. This third group has the maximum phase change (π) between subpulses. The subsequences 12b and 12d both have a phase change of (π/2) between subpulses and correspond to the second and fourth phase groups 11b and 11d, respectively, in Table 1. Finally, the subsequence 12c, corresponding to the first phase group 11a of Table 1 has a zero phase change between subpulses. Thus, the Frank Code has been reordered into a modified P1 code with the phase groups having the largest phase change between subpulses positioned at the ends of the code. Note that second and fourth phase groups 11b and 11d may be interchanged since both have a phase change of π/2. This is a redundancy that is present for all N. Additionally, the third phase group 11c, i.e., the phase group with phase shift π, may also be positioned at the end of the code sequence since maximum attenuation takes place at either end of the pulse.

The rearrangement of the order of transmisssion of the Frank code subsequences by pulse expander-compressor 13 avoids the inverse-weighting effect heretofore produced in the band-limited radar receiver. Thus it will be seen that the present invention solves the problems of peak response suppression and auto-correlation peak-to-sidelobe ratio decrease.

While the invention has been described with reference to a particular transmitting and receiving system, in this case, a radar system, it is noted that the same techniques are available for a variety of other signal processing systems such as sonar, etc.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. An efficient, pre-compression, bandwidth-tolerant, digital pulse expander-compressor comprising:

transform means having N output terminals and responsive to an applied subpulse for successively generating N replicas x(n) of the subpulse, where n=0, 1, 2, ..., N−1, and for weighting the replicas x(n) in accordance with the formula $$F_k = \sum_{n=0}^{N-1} x(e)\exp[-j2\pi nk/N],$$

where k=0, 1, 2, ..., N−1, to provide N weighted subpulses $F_k$, each at a respective one of the N output teminals, whenever one of the N replicas x(n) is generated; and delay-summation means connected to the transform means for delaying each of the N weighted subpulses $F_k$ corresponding to any replica of the applied subpulse by a time which is nN the length of the applied subpulse where k and n are interrelated by the formulae $$k = \frac{N}{2} - n, \text{ for } n = 0, 1, \ldots \frac{N}{2}, \text{ and } k = \frac{3N}{2} - n,$$

$$\text{for } n = \frac{N}{2} + 1, \frac{N}{2} + 2 \ldots N - 1,$$

and for separately summing the real and imaginary parts of the delayed subpulses.

2. The pulse expander-compressor recited in claim 1 wherein the transform means includes:

delay means having N distributed output terminals for producing a uniform delay as long as the applied subpulse between adjacent ones of succesive output terminals.

3. The pulse expander-compressor recited in claim 2 wherein the transform means includes:

a fast Fourier transform circuit connected to the N distributed output terminals of the delay means for forming discrete Fourier transform signals.

4. The pulse expander-compressor recited in claim 1 wherein the delay-summation means includes:

a coherent summer.

5. The pulse expander-compressor recited in claim 4 wherein the delay-summation means includes:

a plurality of delay means, each delay means for producing a delay between the input and output therof N times the length of the applied subpulse, n such delay means being serially connected between the coherent summer and the output terminal of the transform means for the weighted subpulse $F_k$.

6. The pulse eCxpander-compressor cited in claim 1 further including:

means for interchanging the delay times between all two N weighted subpulses $F_i$ and $F_j$ where the absolute value of the phase change between the N weighted subpulses in $F_i$ is equal to the phase change between the N weighted subpulses in $F_j$.

7. An efficient pre-compression, bandwidth-tolerant method of pulse expansion and compression comprising the steps of:

generating N replicas x(n) of an applied subpulse where n=0, 1, 2, ..., N−1 and N is an even integer, in a time which is N times the length of the subpulse;

weighting the replicas in accordance with the formula $$F_k = \sum_{n=0}^{N-1} X(n)\exp[-j2\pi nk/N],$$

where k=0, 1, 2, ..., N−1 to provide N weighted subpulses $F_k$, whenever one of the N replicas x(n) is generated; and separately summing the real and imaginary parts of the weighted subpulses $F_k$ corresponding to any replica of the applied subpulse, after a delay time which is nN the length of the applied subpulse where n and k are interrelated by the formulae $$k = \frac{N}{2} - n, \text{ for } n = 0, 1, 2, \ldots \frac{N}{2}, \text{ and }$$

$$k = \frac{3N}{2} - n, \text{ for } n = \frac{N}{2} + 1, \frac{N}{2} + 2, \ldots N - 1.$$

8. The pulse expansion and compression method recited in claim 7 wherein the generating step includes;

successively delaying the subpulse by uniform delays as long as the applied subpulse.

9. The pulse expansion and compression method recited in claim 8 wherein the weighting step includes:

forming discrete Fourier transform signals with a fast Fourier transform circuit.

* * * * *